United States Patent
Tziovaras et al.

(10) Patent No.: US 12,195,602 B2
(45) Date of Patent: Jan. 14, 2025

(54) PLASTIC FILMS HAVING HIGH VICAT SOFTENING TEMPERATURE IN LAYERED STRUCTURES

(71) Applicant: Covestro Intellectual Property GmbH & Co. KG, Leverkusen (DE)

(72) Inventors: Georgios Tziovaras, Neuss (DE); Heinz Pudleiner, Krefeld (DE); Kira Planken, Goch (DE); Stefan Janke, Brüggen (DE); Christoph Koehler, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 833 days.

(21) Appl. No.: 17/291,660

(22) PCT Filed: Nov. 26, 2019

(86) PCT No.: PCT/EP2019/082559
§ 371 (c)(1),
(2) Date: May 6, 2021

(87) PCT Pub. No.: WO2020/114834
PCT Pub. Date: Jun. 11, 2020

(65) Prior Publication Data
US 2021/0403661 A1 Dec. 30, 2021

(30) Foreign Application Priority Data
Dec. 3, 2018 (EP) .................................... 18209747

(51) Int. Cl.
*C08J 7/04* (2020.01)
*B42D 25/351* (2014.01)
*C08G 64/12* (2006.01)
*G03H 1/02* (2006.01)

(52) U.S. Cl.
CPC ............ *C08J 7/042* (2013.01); *B42D 25/351* (2014.10); *C08G 64/12* (2013.01); *G03H 1/0256* (2013.01); *C08J 2300/22* (2013.01); *C08J 2369/00* (2013.01)

(58) Field of Classification Search
CPC .................................................. B42D 25/30
See application file for complete search history.

(56) References Cited

U.S. PATENT DOCUMENTS

| | | |
|---|---|---|
| 2,970,131 A | 1/1961 | Moyer, Jr. |
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,062,781 A | 11/1962 | Bottenbruch et al. |
| 3,148,172 A | 9/1964 | Fox |
| 3,271,367 A | 9/1966 | Schnell et al. |
| 3,275,601 A | 9/1966 | Schnell et al. |
| 3,692,744 A | 9/1972 | Rich et al. |
| 4,086,212 A | 4/1978 | Bier et al. |
| 4,107,149 A | 8/1978 | Bier et al. |
| 4,176,224 A | 11/1979 | Bier et al. |
| 4,982,014 A | 1/1991 | Freitag et al. |
| 9,012,591 B2 | 4/2015 | Chi et al. |
| 2011/0193337 A1 | 8/2011 | Tziovaras et al. |
| 2018/0290481 A1 | 10/2018 | Sugdon et al. |

FOREIGN PATENT DOCUMENTS

| | | |
|---|---|---|
| CA | 2752100 A1 | 8/2010 |
| CN | 105216410 A | 1/2016 |
| GB | 1122003 A | 7/1968 |
| GB | 1229482 A | 4/1971 |
| GB | 1341318 A | 12/1973 |
| GB | 1367788 A | 9/1974 |
| GB | 1367790 A | 9/1974 |

OTHER PUBLICATIONS

Freitag et al., "Polycarbonate" in Encyclopedia of Polymer Science and Engineering, vol. 11, Second Ed., 1988, pp. 648-718.
Grigo et al. "Polycarbonate" in Becker / Braun, Kunststoff-Handbuch, vol. 3/1, polycarbonates, polyacetals, polyesters, cellulose esters, Carl Hanser Verlag Munich, Vienna, 1992, pp. 117-299.
International Search Report for Application No. PCT/EP2019/082559, mailed Jan. 10, 2020, 4 pages.
Kunststoff-Handbuch, vol. VIII, Karl-Hanser-Verlag, Munich, 1973, p. 695 ff.
Legrand et al., Handbook of Polycarbonate Science and Technology, Marcel Dekker, New York, 2000, p. 72 ff.
Schnell, H., "Chemistry and Physics of Polycarbonates," Polymer Reviews, vol. 9, Interscience Publishers, New York, London, Sydney 1964.

*Primary Examiner* — Ian A Rummel
(74) *Attorney, Agent, or Firm* — John E. Mrozinski, Jr.

(57) ABSTRACT

The present invention relates to layer composites comprising at least one opaque layer a) and at least one transparent layer b), wherein the Vicat softening temperature B/120 determined according to ISO 306:2004 (method B120 50N; 120° C.) of layer a) is ≥156° C., preferably from ≥156° C. to ≤250° C., particularly preferably from ≥156° C. to ≤230° C., and wherein the Vicat softening temperature B/120 determined according to ISO 306:2004 (method B120 50N; 120° C./h), of layer a) is higher than that of layer b), a method for producing such layer composites and security documents, preferably identification documents, comprising such a layer structure.

15 Claims, No Drawings

PLASTIC FILMS HAVING HIGH VICAT SOFTENING TEMPERATURE IN LAYERED STRUCTURES

CROSS-REFERENCE TO RELATED APPLICATION

This application is a national stage application under 35 U.S.C. § 371 of PCT/EP2019/082559, filed Nov. 26, 2019, which claims the benefit of European Application No. 18209747.7, filed Dec. 3, 2018, each of which is incorporated herein by reference.

FIELD

The present invention relates to layer composites comprising at least one opaque layer a) and at least one transparent layer b), wherein the Vicat softening temperature B/120 determined according to ISO 306:2004 (method B120 50N; 120° C.) of layer a) is ≥156° C., preferably from ≥156° C. to ≤250° C., particularly preferably from ≥156° C. to ≤230° C., and wherein the Vicat softening temperature B/120 determined according to ISO 306:2004 (method B120 50N; 120° C./h) of layer a) is higher than that of the thermoplastic of layer b), to a process for producing such layer composites and to security documents, preferably identification documents, comprising such a layer construction.

BACKGROUND

Security documents, in particular identification documents, increasingly comprise polycarbonates, usually in the form of films comprising polycarbonates. Documents based on polycarbonates are generally very durable and a high anti-counterfeiting security of these documents is also achievable. Security documents generally contain various security features which are identifiable with different testing methods and can therefore be identified as an original or a counterfeit.

Documents made of polycarbonate allow integration of a very wide variety of security elements which are recited for example in the DSA (Document Security Alliance) list of security elements. However, the integration of five to not more than ten security elements in one document is sensible since for example identity checking of a person by means of a passport should take up only a short period, generally ten to twenty seconds, of the checker's time. Security features identifiable quickly without aids and with a low error rate are therefore particularly desirable.

Popular security features are transparent areas in, for example, identification cards or in the data pages of passports. These transparent regions are also known as "windows". Holograms, security marks and other elements which are identifiable as an original or a counterfeit by visual inspection may be introduced into these windows. The functioning of the security feature is based on the high transparency of polycarbonate. If the transparency of the document in the window is impaired then said document may be a counterfeit. The reasons for this are as follows: When bonding a further transparent film, for example containing false personal information, over the document the change in the window is clearly apparent. The window appears less clear when looking through it. The clarity of the window is likewise disturbed by attempts to open and re-bond the document.

The manufacture of windows in security documents is typically carried out by stamping one or more openings into the opaque white core of the security and/or identification document, as described for example in ID & Secure Document News Vol. 4, July 2016. This white opaque core of the security and/or identification document comprises not only visible security features such as a hologram (embossed and volume holograms), security printing or other elements but also further security features, for example electronic components such as antennae and IC chips, which are not visible to the observer on account of the upper white layer. The openings may have any desired shapes but are predominantly circular or elliptical. These openings are filled with a transparent piece of film of identical shape and thickness which is separately stamped from a corresponding film piece. Further transparent films may additionally be arranged on the top or bottom surface of the core. Lamination of such a layer construction affords a monolithic layer composite.

A further security feature is the embedding of electronic components such as for example antennae, IC chips, volume holograms, embossed holograms or the like. These components are typically laminated into the layer composite. WO2010/091796 A1 discloses a process for producing a laminated layer composite, wherein at least one base layer and at least one further layer having a component arranged between them and made of two thermoplastic materials having different Vicat softening temperatures B/120 are subjected to a two-stage lamination to afford a layer composite. The Vicat softening temperature B/120 of the base layer has a higher Vicat softening temperature B/120 than the further layer. The disadvantage of this process is firstly that it requires a complex two-stage lamination process and secondly that this process can result in flow of the antenna-bearing layer, thus resulting in distortion of the right-angled legs of the antenna.

The implementation of windows as security features is very complex and requires a plurality of operating steps in terms of stamping and filling the window with a transparent material which must be provided in addition to the materials of the individual layers. The distortion of the geometry of the stamped windows during lamination of the individual layers to afford a laminated layer composite is a further disadvantage. When installing electronic components and/or volume holograms it is disadvantageous that in the case of lamination due to the flow of the thermoplastic material during lamination the geometry of the electronic component is distorted, the boundary layer becomes wavy and the component thus becomes visible. This waviness can result in disturbance of the image printed thereupon.

SUMMARY

The present invention accordingly has for its object to provide a layer construction which especially after lamination to afford a monolithic layer composite allows largely distortion-free geometries of windows and embedding of electronic components and/or further security features in the resulting laminated layer composite and causes no disturbances in printed images.

DETAILED DESCRIPTION

This object was surprisingly achieved by the layer construction according to the invention comprising at least a) one opaque layer a) containing one or more polycarbonate(s) or copolycarbonate(s) based on diphenols, preferably copolycarbonate(s) based on diphenols, wherein layer a) has a light transmission of ≥0.1% and ≤85%, preferably of ≥1% and ≤65%, particularly preferably of ≥2% and ≤50%, determined according to ISO 13468-2:2006-07 and b) one further transparent layer b) containing at least one thermoplastic, wherein the at least one further layer b) has a light transmission of ≥85% and ≤98%, preferably of ≥87% and ≤95%, particularly preferably of ≥88% and ≤92%, determined according to ISO 13468-2:2006-07, characterized in that the Vicat softening temperature B/120 determined according to ISO 306:2004 (method B120 50N; 120° C./h) of the one or more polycarbonates or copolycarbonates based on diphenols of layer a) is ≥156° C., preferably from ≥156° C. to ≤250° C., particularly preferably from ≥156° C. to ≤230° C., and in that the Vicat softening temperature B/120 determined according to ISO 306:2004 (method B120 50N; 120° C./h) of layer a) is higher than that of the thermoplastic of layer b).

In one embodiment of the invention the at least one layer b) comprises a thermoplastic having a Vicat softening temperature of B/120 determined according to ISO 306 (50N; 50°/h) in a range from ≥135° C. to ≤155° C., preferably ≥140° C. to ≤151° C.

It is preferable when the one or more polycarbonates or copolycarbonates based on diphenols of layer a) has an $M_w$ (weight-average molecular weight, determined by size exclusion chromatography (SEC) after preceding calibration with polycarbonate calibration substances) of at least 10 000 g/mol, preferably of 15 000 g/mol to 300 000 g/mol, particularly preferably 17 000 to 36 000 g/mol, very particularly preferably 17 000 to 34 000 g/mol. They may be linear or branched and may be homopolycarbonates or copolycarbonates.

In a preferred embodiment in layer a) the one or more polycarbonates or copolycarbonates based on diphenols, preferably copolycarbonates based on diphenols, comprise at least one carbonate structural unit of formula (I-1)

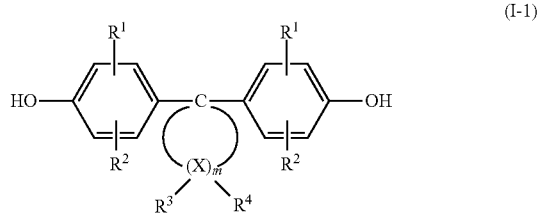

(I-1)

wherein $R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl, m is an integer from 4 to 7, preferably 4 or 5, $R^3$ and $R^4$ individually selectable for each X independently of one another represent hydrogen or $C_1$-$C_6$-alkyl and X represents carbon and/or nitrogen, with the proviso that for at least one atom X, $R^3$ and $R^4$ both represent alkyl.

The one or more polycarbonates or copolycarbonates based on diphenols, preferably copolycarbonates based on diphenols, may alternatively be those comprising at least one carbonate structural unit of formulae (I-2), (I-3) and/or (I-4) shown below,

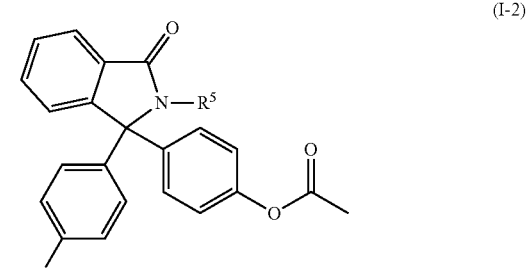

(I-2)

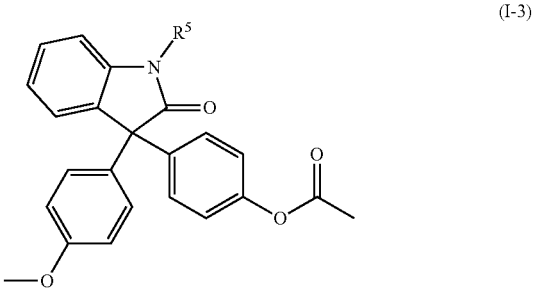

(I-3)

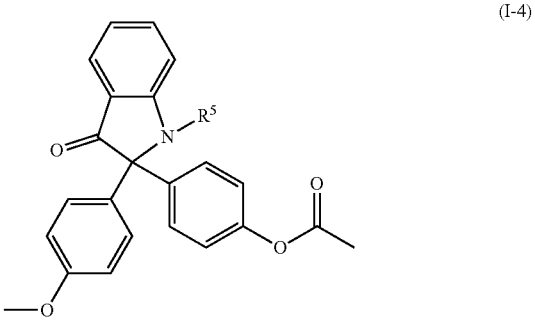

(I-4)

wherein $R^5$ represents a $C_1$- to $C_4$-alkyl radical, aralkyl radical or aryl radical, preferably a methyl radical or phenyl radical, very particularly preferably a methyl radical.

In a particularly preferred embodiment in layer a) the one or more polycarbonates or copolycarbonates based on diphenols comprise at least one carbonate structural unit of formula (I-1).

These polycarbonates or copolycarbonates may be produced in known fashion from diphenols, carbonic acid derivatives, optionally chain terminators and optionally branching agents. Particulars pertaining to the production of polycarbonates are disclosed in many patent documents spanning approximately the last 40 years. Reference is made here merely by way of example to H. Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, volume 11, second edition, 1988, pages 648-718 and finally to Dres. U. Grigo, K. Kirchner and P. R. Müller, "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Starting products for the realization of polycarbonate structural units according to formula (I-1) are dihydroxydiphenylcycloalkanes of formula (I-1a)

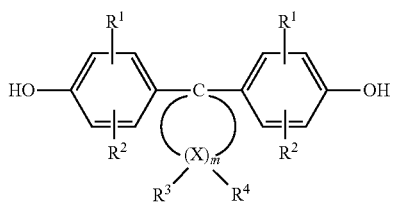
(I-1a)

wherein
X, $R^1$, $R^2$, $R^3$, $R^4$ and m are as defined for formula (I-1).

Starting products for the realization of polycarbonate structural units according to formula (I-2), (I-3) and/or (I-4) are dihydroxydiphenylcycloalkanes of formula (I-2a), (I-3a) and/or (I-4a)

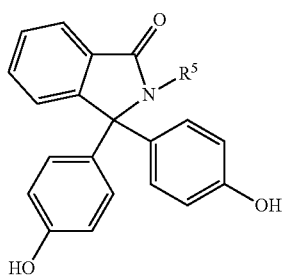
(I-2a)

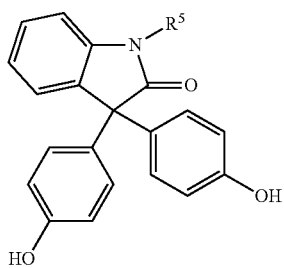
(I-3a)

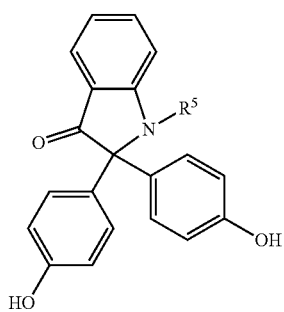
(I-4a)

wherein $R^5$ represents a $C_1$- to $C_4$-alkyl radical, aralkyl radical or aryl radical, preferably a methyl radical or phenyl radical, very particularly preferably a methyl radical.

It is preferable when in formula (I-1a) the radicals R1 and R2 are hydrogen.

It is preferable when in formula (I-1a) for 1-2 atoms X, especially only for one atom X, $R^3$ and $R^4$ both represent alkyl.

The preferred alkyl radical in formula (I-1a) for $R^3$, $R^4$ is methyl; the X atoms alpha to the diphenyl-substituted carbon atom (C-1) are preferably not dialkyl-substituted and at least one X atom beta to C-1 is preferably alkyl disubstituted.

Preferred in formula (I-1a) are dihydroxydiphenylcycloalkanes having 5 and 6 ring carbon atoms in the cycloaliphatic radical (m=4 or 5 in formula (I-1a)), for example the diphenols of formulae (I-1b) to (I-1d),

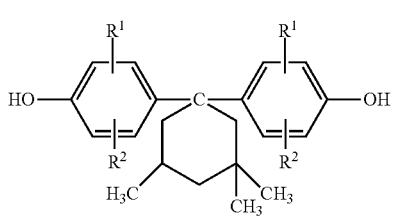
(I-1b)

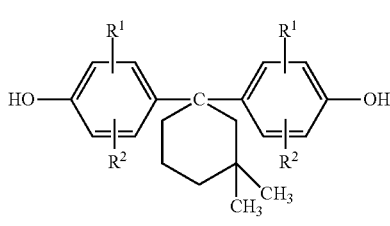
(I-1c)

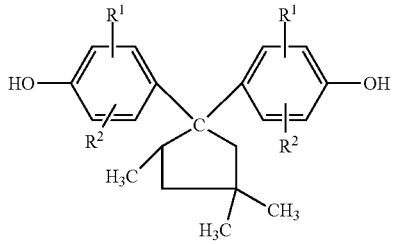
(I-1d)

wherein 1,1-bis(4-hydroxyphenyl)-3,3,5-trimethylcyclohexane (formula (I-1b) where $R^1$ and $R^2$=H) is particularly preferred. The polycarbonates may be produced from diphenols of formula (I-1a) according to EP 0359953 A1.

It is possible to use either one diphenol of formula (I-1a) to form homopolycarbonates or two or more diphenols of formula (I-1a) to form copolycarbonates.

Furthermore, the diphenols of formula (I-1a) may also be employed in admixture with other diphenols, for example with those of formula (I-1e)

HO—Z—OH (I-1e), to produce high molecular weight thermoplastic polycarbonates or copolycarbonates.

Suitable other diphenols of formula (I-1e) are those in which Z is an aromatic radical which has 6 to 34 carbon atoms and can comprise one or more aromatic rings, may be substituted and may comprise aliphatic radicals or different cycloaliphatic radicals to those of formula (I-1a) or heteroatoms as bridging elements.

Examples of diphenols of formula (I-1e) are:
hydroquinone, resorcinol, dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) ethers, bis(hydroxyphenyl)ketones, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

These and further suitable diphenols are described for example in U.S. Pat. Nos. 3,028,365, 2,999,835, 3,148 172, 3,275,601, 2,991,273, 3,271,367, 3,062,781, 2,970,131 and 2,999,846, in DE-A 1 570 703, 2 063 050, 2 063 052, 2 211 956, in Fr-A 1 561 518 and in H. Schnell, Chemistry and Physics of Polycarbonates, Interscience Publishers, New York 1964, page 28 ff.; page 102 ff. and in D. G. Legrand, J. T. Bendler, Handbook of Polycarbonate Science and Technology, Marcel Dekker New York 2000, page 72 ff.

Preferred other diphenols of formula (I-1e) are for example:
resorcinol, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane-2,2-bis(4-hydroxyphenyl)-p-diisopropylbenzene, 2,2-bis(3-methyl-4-hydroxyphenyl)propane, 2,2-bis(3-chloro-4-hydroxyphenyl)propane, bis-(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenypcyclohexane-2,2-bis(3,5-dimethyl-4-hydroxyphenyl)-p -diisopropylbenzene, 2,2-bis(3,5-dichloro-4-hydroxyphenyl)propane and 2,2-bis(3,5-dibromo-4-hydroxyphenyl)propane.

Particularly preferred diphenols of formula (Ie) are for example:
2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)cyclohexane.

Especially preferred as diphenols of formula (I-1e) are 4,4'-dihydroxydiphenyl and 2,2-bis-(4-hydroxyphenyl)propane. The other diphenols may be employed either alone or in admixture.

The freely selectable composition with other diphenols, in particular with those of formula (I-1e), also allows the polycarbonate properties, in particular the Vicat softening temperature B/120 to be varied in advantageous fashion.

The total proportion of the carbonate units of formulae (I-1), (I-2), (I-3) and (I-4) in the copolycarbonate is preferably 0.1-88 mol %, particularly preferably 1-86 mol %, very particularly preferably 5-84 mol % and in particular 10-82 mol % (based on the sum of the moles of diphenols employed).

It is preferable when the copolycarbonate units of formula (I-1) derive from diphenols of above-described formulae (I-1a) and (I-1e), preferably of formulae (I-1b), (I-1c) and/or (I-1d) and 2,2-bis(4-hydroxyphenyl)propane and/or 4,4'-dihydroxydiphenyl, particularly preferably of formulae (I-1b) and 2,2-bis(4-hydroxyphenyl)propane.

In another embodiment the copolycarbonate units derive from diphenols of formulae (I-1e) and (I-2a), (I-3a) and/or (I-4a).

A preferred copolycarbonate is constructed from 17% to 62% by weight of 2,2-bis(4-hydroxyphenyl)propane and 83% to 38% by weight of comonomer of general formula (I-2a), (I-3a) and/or (I-4a), wherein the amounts of bisphenol A and comonomer of general formulae (I-2a), (I-3a) and/or (I-4a) sum to 100% by weight.

The molar ratio of diphenols of formula (I-1a) to the optionally co-usable other diphenols of formula (I-1e) shall be between 100 mol % of (I-1a) to 0 mol % of (I-1e) and 2 mol % of (I-1a) to 98 mol % of (I-1e), preferably between 100 mol % of (I-1a) to 0 mol % of (I-1e) and 10 mol % of (I-1a) to 90 mol % of (I-1e) and especially between 100 mol % of (I-1a) to 0 mol % of (I-1e) and 30 mol % of (I-1a) to 70 mol % of (I-1e).

In a particularly preferred embodiment the proportion of diphenols of formula (I-1a), preferably of formula (I-1b), in the copolycarbonate is 10% to 95% by weight, particularly preferably 44-85% by weight. 2,2-Bis(4-hydroxyphenyl) propane and/or 4,4'-dihydroxydiphenyl are employed as the preferred diphenol of formula (I-1e) which is preferably present in an amount of 15% to 56% by weight. It is very particularly preferable when the copolycarbonate is constructed from diphenols of formula (I-1b) and 2,2-bis(4-hydroxyphenyl)propane.

The high molecular weight polycarbonates or copolycarbonates composed of the diphenols of formula (I-1a), optionally in combination with other diphenols, may be produced by the known polycarbonate production processes as mentioned hereinabove. The various diphenols may be bonded to one another in random or blockwise fashion.

The polycarbonates or copolycarbonates may be branched in a manner known per se. When branching is desired this may be achieved in known fashion by condensation of small amounts, preferably amounts between 0.05 and 2.0 mol % (based on employed diphenols), of compounds which are trifunctional or more than trifunctional, in particular those having three or more than three phenolic hydroxyl groups. Some branching agents having three or more than three phenolic hydroxyl groups include:
phloroglucinol, 4,6-dimethyl-2,4,6-tri(4-hydroxyphenyl)-hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis [4,4-bis(4-hydroxyphenyl)cyclohexyl]propane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]-orthoterephthalate, tetra (4-hydroxyphenyl)methane, tetra[4-(4-hydroxyphenylisopropyl)phenoxy]-methane and 1,4-bis(4', 4"-dihydroxytriphenylmethypbenzene.

Some of the other trifunctional compounds are 2,4-dihydroxybenzoic acid, trimesic acid, cyanuryl chloride and 3,3-bis(3-methyl-4-hydroxyphenyl)-2-oxo-2,3-dihydroindole.

To control or alter the end groups it is also possible to employ for example one or more monohydroxyaryl compounds not used to produce the diaryl carbonate(s) used as chain terminators. These may be those of the general formula (III)

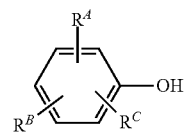

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and
$R^B$, $R^C$ are identical or different and independently of one another represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol 4-ethylphenol, 4-n-propylphenol, 4-isopropylphenol, 4-n-butylphenol, 4-isobutylphenol, 4-tert -butylphenol, 4-n-pentylphenol, 4-n-hexylphenol, 4-isooctylphenol, 4-n-nonylphenol, 3-pentadecylphenol, 4-cyclohexylphenol, 4-(1-methyl-l-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents may include compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexylipropane, 2,4-bis(4-hydroxyphenylisopropyl)phenol and tetra(4-hydroxyphenyl)methane.

Other suitable compounds having three and more functional groups are, for example, 2,4-dihydroxybenzoic acid, trimesic acid/trimesoyl trichloride, cyanuric trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The incorporation of the diphenols of formula (I-1a) formed polycarbonates or copolycarbonates with high thermal stability which have good properties in other respects too. This applies especially to the polycarbonates or copolycarbonate based on the diphenols of formula (I-1a) in which m is 4 or 5 and very particularly to the polycarbonates or copolycarbonates based on the diphenols (I-1b), wherein $R^1$ and $R^2$ are independently of one another as defined for formula (I-1a) and are particularly preferably hydrogen.

These polycarbonates or copolycarbonates based on the diphenols of formula (I-1b), wherein in particular $R^1$ and $R^2$ are hydrogen, have a high thermal stability, good UV stability and good flow characteristics in the melt.

Layer a) according to the invention has a light transmission of $\geq 0.1\%$ and $\leq 85\%$, preferably of $\geq 1\%$ and $\leq 65\%$, particularly preferably of $\geq 2\%$ and $\leq 50\%$, determined according to ISO 13468-2:2006-07.

In one embodiment layer a) comprises at least one filler. The filler is preferably at least one color pigment and/or at least one other filler for producing a translucence of the filled layer, particularly preferably a white pigment, very particularly preferably titanium dioxide, zirconium dioxide and/or barium sulfate and in a particularly preferred embodiment titanium dioxide.

The recited fillers are preferably added in amounts of 2% to 50% by weight, particularly preferably of 5% to 40% by weight, based on the total weight of the layer containing the filler which may be produced for example by extrusion or coextrusion.

Layer a) may have a layer thickness in the range from $\geq 10$ to $\leq 300$ μm, preferably from $\geq 20$ to $\leq 200$ μm, particularly preferably from $\geq 25$ to $\leq 150$ μm.

The at least one further transparent layer b) contains at least one thermoplastic, has a light transmission of $\geq 85\%$ and $\leq 98\%$, preferably of $\geq 87\%$ and $\leq 95\%$, particularly preferably of $\geq 88\%$ and $\leq 92\%$, determined according to ISO 13468-2:2006-07 and the Vicat softening temperature B/120 of the thermoplastic of layer b) is lower than that of the one or more polycarbonates or copolycarbonates based on diphenols of layer a). It is preferable when the at least one thermoplastic of layer b) has a Vicat softening temperature of B/120 determined according to ISO 306 (50N; 120°/h) in a range from $\geq 135°$ C. to $\leq 155°$ C., preferably $\geq 140°$ C. to $\leq 151°$ C.

The at least one thermoplastic of layer b) may be at least one plastic selected from polymers of ethylenically unsaturated monomers and/or polycondensates of bifunctional reactive compounds and/or polyaddition products of bifunctional reactive compounds or mixtures thereof.

Particularly suitable thermoplastics are polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloaliphatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned.

Particularly preferred thermoplastics are one or more polycarbonate(s) or copolycarbonate(s) based on diphenols or blends comprising at least one polycarbonate or copolycarbonate. Very particular preference is given to blends containing at least one polycarbonate or copolycarbonate and at least one polycondensate or copolycondensate of terephthalic acid, of naphthalenedicarboxylic acid or of a cycloalkyldicarboxylic acid, preferably of cyclohexanedicarboxylic acid. Very particular preference is given to polycarbonates or copolycarbonates especially having average molecular weights Mw (determined by size exclusion chromatography (SEC) according to ISO 16014-1:2012 after preceding calibration with polycarbonate calibration substances) of 500 g/mol to 100 000 g/mol, preferably of 10 000 g/mol to 80 000 g/mol, particularly preferably of 15 000 g/mol to 40 000 g/mol or blends thereof with at least one polycondensate or copolycondensate of terephthalic acid having average molecular weights Mw (determined by size exclusion chromatography (SEC) according to ISO 16014-1:2012 after preceding calibration with polycarbonate calibration substances) of 10 000 g/mol to 200 000 g/mol, preferably of 21 000 g/mol to 120 000 g/mol.

Suitable poly- or copolycondensates of terephthalic acid in preferred embodiments of the invention are polyalkylene terephthalates. Suitable polyalkylene terephthalates are, for example, reaction products of aromatic dicarboxylic acids or their reactive derivatives (for example dimethyl esters or anhydrides) and aliphatic, cycloaliphatic or araliphatic diols and mixtures of these reaction products.

Preferred polyalkylene terephthalates may be prepared from terephthalic acid (or reactive derivatives thereof) and aliphatic or cycloaliphatic diols having 2 to 10 carbon atoms by known methods (Kunststoff-Handbuch, vol. VIII, p. 695 ff, Karl-Hanser-Verlag, Munich 1973).

Preferred polyalkylene terephthalates contain at least 80 mol %, preferably 90 mol %, of terephthalic acid radicals, based on the dicarboxylic acid component, and at least 80 mol %, preferably at least 90 mol %, of ethylene glycol and/or butane-1,4-diol and/or cyclohexane-1,4-dimethanol radicals based on the diol component.

The preferred polyalkylene terephthalates may contain, in addition to terephthalic acid radicals, up to 20 mol % of radicals of other aromatic dicarboxylic acids having 8 to 14 carbon atoms or of aliphatic dicarboxylic acids having 4 to 12 carbon atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene and/or butane-1,4-diol glycol radicals, up to 80 mol % of other aliphatic diols having 3 to 12 carbon atoms or of cycloaliphatic diols having 6 to 21 carbon atoms, for example radicals of propane-1,3-diol, 2-ethylpropane-1, 3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3 -diol and 2-ethylhexane-1,6-diol, 2,2-diethylpropane-1,3 -diol, hexane-2,5-diol, 1,4-di([beta]-hydroxyethoxy)benzene, 2,2-bis(4-hydroxycyclohexyl)propane, 2,4-dihydroxy-1,1,3,3-tetramethylcyclobutane, 2,2-bis(3-[beta]-hydroxyethoxyphenyppropane and 2,2-bis(4-hydroxypropoxyphenyl) propane (cf. DE-OS 24 07 674, 24 07 776, 27 15 932).

The polyalkylene terephthalates may be branched by incorporation of relatively small amounts of tri- or tetrahydric alcohols or tri- or tetrabasic carboxylic acids, as described for example in DE-OS 19 00 270 and U.S. Pat. No. 3,692,744. Examples of preferred branching agents are trimesic acid, trimellitic acid, trimethylolethane and trimethylolpropane and pentaerythritol.

It is preferable when not more than 1 mol % of the branching agent is used, based on the acid component.

Particular preference is given to polyalkylene terephthalates which have been prepared solely from terephthalic acid and the reactive derivatives thereof (e.g. the dialkyl esters thereof) and ethylene glycol and/or butane-1,4-diol and/or cyclohexane-1,4-dimethanol radicals, and to mixtures of these polyalkylene terephthalates.

Preferred polyalkylene terephthalates are also copolyesters prepared from at least two of the abovementioned acid components and/or from at least two of the abovementioned alcohol components; particularly preferred copolyesters are poly(ethylene glycol/butane-1,4-diol) terephthalates.

The polyalkylene terephthalates used with preference as component preferably have an intrinsic viscosity of about 0.4 to 1.5 dl/g, preferably 0.5 to 1.3 dl/g, measured in each case in phenol/o-dichlorobenzene (1:1 parts by weight) at 25° C.

In particularly preferred embodiments of the invention the blend of at least one polycarbonate or copolycarbonate with at least one poly- or copolycondensate of terephthalic acid is a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate may preferably be one comprising 1% to 90% by weight of polycarbonate or copolycarbonate and 99% to 10% by weight of poly- or copolybutylene terephthalate or glycol-modified poly- or copolycyclohexanedimethylene terephthalate, preferably comprising 1% to 90% by weight of polycarbonate and 99% to 10% by weight of polybutylene terephthalate or glycol-modified polycyclohexanedimethylene terephthalate, wherein the proportions sum to 100% by weight. Such a blend of polycarbonate or copolycarbonate with poly- or copolybutylene terephthalate or glycol-modified poly- or copolycyclohexanedimethylene terephthalate may particularly preferably be one comprising 20% to 85% by weight of polycarbonate or copolycarbonate and 80% to 15% by weight of poly- or copolybutylene terephthalate or glycol-modified poly- or copolycyclohexanedimethylene terephthalate, preferably comprising 20% to 85% by weight of polycarbonate and 80% to 15% by weight of polybutylene terephthalate or glycol-modified polycyclohexanedimethylene terephthalate, wherein the proportions sum to 100% by weight. Such a blend of polycarbonate or copolycarbonate with poly- or copolybutylene terephthalate or glycol-modified poly- or copolycyclohexanedimethylene terephthalate may very particularly preferably be one comprising 35% to 80% by weight of polycarbonate or copolycarbonate and 65% to 20% by weight of poly- or copolybutylene terephthalate or glycol-modified poly- or copolycyclohexanedimethylene terephthalate, preferably comprising 35% to 80% by weight of polycarbonate and 65% to 20% by weight of polybutylene terephthalate or glycol-modified polycyclohexanedimethylene terephthalate, wherein the proportions sum to 100% by weight. In very particularly preferred embodiments blends of polycarbonate and glycol-modified polycyclohexanedimethylene terephthalate may be concerned in the compositions mentioned above.

Suitable polycarbonates or copolycarbonates in preferred embodiments are particularly aromatic polycarbonates or aromatic copolycarbonates.

The polycarbonates or copolycarbonates may be linear or branched in known fashion.

In terms of more detailed description and elucidations, production and preferred ranges for the polycarbonates or copolycarbonates reference is made to what is recited above for layer a). The polycarbonates of layer b) preferably employ diphenols of general formula (Ie), very particularly preferably 4,4'-dihydroxydiphenyl and 2,2-bis(4-hydroxyphenyl)propane.

In one embodiment layer b) has a layer thickness of ≥30 to ≤800 μm, preferably ≥35 to ≤700 μm, particularly preferably ≥50 to ≤600 μm.

It is preferable when at least layers a) and b) have a surface area in a range from 1 to 1000 cm², preferably in a range from 2 to 8000 cm², particularly preferably in a range from 10 to 5000 cm². It is preferable when the two layers a) and b) in the layer construction have the same surface dimensions. It is preferable when the two layers a) and b) overlap completely in the layer construction.

In a further embodiment of the invention the layer composite may comprise one or more further layers c) containing at least one thermoplastic. In one embodiment these one or more layers c) may have a light transmission of ≥85% to ≤98%, preferably of ≥87% and ≤95%, particularly preferably of ≥88% and ≤92%, determined according to ISO 13468-2:2006-07.

It is preferable when the at least one layers c) have the same surface area as layers a) and b). It is further preferable when the layers a), b) and c) overlap completely in the layer construction.

The at least one thermoplastic of the one or more layers c) may independently be a thermoplastic as described in connection with layer b). For the avoidance of repetition, reference is therefore made to the elucidations and the preferred ranges of layer b).

In a preferred embodiment of the layer construction the layer construction comprises at least one further layer c) containing one or more polycarbonates or copolycarbonates based on diphenols, preferably copolycarbonates based on diphenols. In this preferred embodiment of the layer construction layers a) and c) are preferably identical in construction but may differ from one another in thickness depending on the application. It is particularly preferable when one of the at least one further layers c) is arranged on the other side with respect to layer a) in the layer construction than layer b). It is particularly preferable when the layer construction in this preferred embodiment of the layer construction has an arrangement of the layers in which layer b) is arranged between layers a) and c). Further layers c) may be arranged between the layers a) and b) and between the layers a) and c), wherein these further layers c) may likewise contain a thermoplastic.

These one or more layers c) may independently of one another be identical or different from layer b) in terms of material and thickness. The one or more layers c) may be arranged in the layer composite such that at least the layer sequences c), a), b), or a), b), c) or c), a), b), c) result. However, it is also possible to arrange in addition to the abovementioned layer sequences further layers c) which independently of one other may be identical or different in terms of material and layer thickness.

The one or more layers c) preferably have a thickness of $\geq 10$ to $\leq 300$ µm, preferably of $\geq 20$ to $\leq 200$ µm, particularly preferably of $\geq 25$ to $\leq 150$ µm.

In another embodiment of the layer construction according to the invention the at least one layer a), the at least one layer b) and/or the one or more layers c) contain at least one laser-sensitive additive, preferably black pigment, particularly preferably carbon black. This embodiment of the invention is particularly readily amenable to laser gravure. The marking of plastic films by laser gravure is referred to as laser marking for short both in the art and hereinbelow. Accordingly the term "laser marked" is hereinbelow to be understood as meaning marked by laser gravure. The process of laser gravure is known to those skilled in the art and is not to be confused with printing using laser printers.

The laser-sensitive additive may be present in the film according to the invention in an amount of $\geq 3$ to $\leq 200$ ppm, preferably of $\geq 4$ to $\leq 180$ ppm, particularly preferably of $\geq 5$ to $\leq 160$ ppm.

The particle size of the laser-sensitive additive is preferably in the range from 100 nm to 10 µm and particularly advantageously in the range from 50 nm to 2 µm.

In one embodiment layer a) has at least one opening. The opening in layer a) may have different shapes and sizes, preferably the opening in layer a) has a circular or elliptical shape. The opening in layer a) may preferably be introduced into layer a) by stamping with a suitable tool by methods known to those skilled in the art.

In the abovementioned embodiment of the invention in which layer a) has at least one opening, layer a) preferably has a layer thickness of $\geq 10$ to $\leq 150$ µm, preferably of $\geq 20$ to $\leq 100$ µm, particularly preferably of $\geq 25$ to $\leq 75$ µm.

In a further embodiment of the invention the opening in layer a) is not additionally filled with a thermoplastic material.

In another embodiment of the invention one or more electronic components, volume holograms and/or embossed holograms are arranged between layer a) and layer b). This component may be a microchip or an antenna.

The layer composite may comprise further layers of a thermoplastic as described hereinabove.

The layers a), b), c) and/or optionally further layers are preferably films, in particular mono- and/or multilayer films, producible by extrusion or coextrusion and comprising the abovementioned thermoplastics. The layers a), b) and/or c) are preferably monofilms producible by extrusion or coextrusion.

The layer thicknesses of the individual layers a), b) and/or c) may be achieved independently of one another either by extrusion or coextrusion of the corresponding mono- and/or multilayer films in the corresponding layer thickness. However, the layer thicknesses of the individual layers a), b) and/or c) may also be achieved independently of one another by superposing corresponding thin films of these layers.

One or more security features may be introduced at any desired locations in the layer composite according to the invention. Security features can be introduced into the layer composite as electronic components, for example antennae and microchips, holograms and/or security marks. Ideally one or more security features are placed in the layer construction according to the invention such that they are at least partially covered by layer a). Placing one or more security features between layers a) and b) would be conceivable for example In a preferred embodiment layer a) may comprise one or more openings. The opening in layer a) preferably makes a window in layer b) visible. In this embodiment further security features may also be present at other locations in the layer composite according to the invention. Ideally at least one security feature may be placed such that it is visible through the window. In this embodiment volume and/or embossed holograms in particular may be arranged in the abovementioned manner.

When a further layer c) is present in the layer construction this layer c) preferably likewise has an opening at the same location in terms of the surface area of the layers as layer a), preferably of the same size as the opening in layer a). Ideally the opening in layer c) is placed in such a way relative to the window in layer b) and the opening in layer a) that the at least one security feature becomes visible from both sides of the security element. In this embodiment volume and/or embossed holograms in particular may be arranged in the abovementioned manner.

It is preferable when an antenna is arranged between layers a) and b) or layers b) and c). The antenna is preferably arranged such that it does not become visible in the opening in layer a) or c) nor, accordingly, in the window in layer b).

The individual layers of the layer construction may be compressed for a particular duration by lamination using a laminating press under the action of heat and pressure to form a monolithic composite of the individual layers, a so-called laminate. The pressure and temperature during the laminating operation are to be chosen such that the individual layers and the optionally present security features are not damaged but the individual layers form a strong composite which does not subsequently break up into its individual layers.

The invention further provides a process for producing a layer composite comprising
  providing a layer construction comprising at least
    a) one opaque layer a) containing one or more polycarbonates or copolycarbonates based on diphenols, wherein layer a) has a light transmission of $\geq 0.1\%$ and $\leq 85\%$, preferably of $\geq 1\%$ and $\leq 65\%$, particularly preferably of $\geq 2\%$ and $\leq 50\%$, determined according to ISO 13468-2:2006-07 and
    b) a further transparent layer b) containing at least one thermoplastic, wherein the at least one further layer b) has a light transmission of ≥85% and ≤98%, preferably of ≥87% and ≤95%, particularly preferably of ≥88% and ≤92%, determined according to ISO 13468-2:2006-07, characterized in that the Vicat softening temperature B/120 determined according to ISO 306:2004 (method B120 50N; 120° C./h) of the one or more polycarbonates or copolycarbonates of layer a) is ≥156° C., preferably from ≥156 ° C. to ≤250 ° C., particularly preferably from ≥156 ° C. to ≤230 ° C., and in that the Vicat softening temperature B/120 determined according to ISO 306:2004 (method B120 50N; 120° C./h) is higher than that of layer b), optionally placing one or more electronic components, one or more volume holograms and/or one or more embossed holograms between the layers a) and b), optionally stamping at least one opening in layer a), optionally providing one or more further layers c) comprising at least one thermoplastic, laminating the layer construction at a temperature of 120° C. to 210° C., preferably of 130° C. to 205° C., particularly preferably of 165° C. to 200° C., and a pressure of 10 N/cm$^2$ to 400 N/cm$^2$, preferably of 30 N/cm$^2$ to 300 N/cm$^2$, particularly preferably of 40 N/cm$^2$ to 250 N/cm$^2$.

For the avoidance of repetition reference is made to what is recited above in respect of the embodiments and preferred ranges of the individual layers.

It is preferable when an opening is likewise stamped into the layer c)/the layers c) if present. It is preferable when the openings in layers a) and c) overlap such that a window in layer b) is visible through the openings from both sides of the layer construction.

In another embodiment of the process according to the invention the layer construction may be inscribed by means of laser radiation before and/or after lamination.

The invention further provides a security document, preferably identification document, comprising at least one layer construction according to the invention as described hereinabove.

The invention further provides for the use of an opaque layer a) containing one or more polycarbonates or copolycarbonates based on diphenols having a light transmission of ≥0.1% and ≤85%, preferably of ≥1% and ≤65%, particularly preferably of ≥2% and ≤50%, determined according to ISO 13468-2:2006-07, characterized in that the Vicat softening temperature B/120 determined according to ISO 306:2004 (method B120 50N; 120° C./h) of the one or more polycarbonates or copolycarbonates of layer a) is ≥156° C., preferably from ≥156 ° C. to ≤250 ° C., particularly preferably from ≥156 ° C. to ≤230 ° C., to produce windows in security documents, preferably identification documents.

EXAMPLES

Raw Materials Used

Makrolon™ 3108: high-viscosity amorphous thermoplastic bisphenol A polycarbonate from Covestro AG having an MVR of 6.5 g/10 min according to ISO 1133-1:2011 at 300° C. and 1.2 kg loading and a Vicat softening temperature (VST) according to ISO 306:2004 method B120 at 50 N; 120° C./h of 150° C. and a glass transition temperature $T_g$ according to ISO 11357-1,-2 of 149° C.

KRONOS™ 2230: titanium dioxide from Kronos for polycarbonate and other industrial thermoplastics having a $TiO_2$ content ≥96%

Polycarbonate PC 1:

149.0 g (0.65 mol) of bisphenol A (2,2-bis(4-hydroxyphenyl)propane), 107.9 g (0.35 mol) of 1,1-bis(4-hydroxyphenyl)-3,3,5-trimethylcyclohexane, 336.6 g (6 mol) of KOH and 2700 g of water were dissolved with stirring in an inert gas atmosphere. A solution of 1.88 g of phenol in 2500 ml of methylene chloride was then added. 198 g (2 mol) of phosgene were introduced into the well-stirred solution at pH 13 to 14 and 21° C. to 25° C. 1 ml of ethylpiperidine was then added and the mixture stirred for 45 min. The bisphenoxide-free aqueous phase was removed and the organic phase acidified with phosphoric acid, neutralized by washing with water and freed of solvent. The polycarbonate showed a relative solution viscosity of 1.255 determined according to DIN EN ISO 1628-1:2009. The Vicat softening temperature of the polymer was determined as 183° C. according to ISO 306:2004 method B120 at 50 N; 120° C./h.

Polycarbonate PC 2:

Analogously to PC 1 a mixture of 91.6 g (0.40 mol) of bisphenol A and 185.9 g (0.60 mol) of 1,1-bis(4-hydroxyphenyl)-3,3,5-trimethylcyclohexane was converted into the corresponding polycarbonate 2. The polycarbonate showed a relative solution viscosity of 1.251 determined according to DIN EN ISO 1628-1:2009.

The Vicat softening temperature of the polymer was determined as 204° C. according to ISO 306:2004 method B120 at 50 N; 120° C./h.

Polycarbonate PC 3:

Analogously to PC 1 a mixture of 44.2 g (0.19 mol) of bisphenol A and 250.4 g (0.81 mol) of 1,1-bis(4-hydroxyphenyl)-3,3,5-trimethylcyclohexane was converted into the corresponding polycarbonate.

The polycarbonate showed a relative solution viscosity of 1.248 determined according to DIN EN ISO 1628-1:2009.

The Vicat softening temperature of the polymer was determined as 216° C. according to ISO 306:2004 method B120 at 50 N; 120° C./h.

Compounding a Batch for Production of a Layer Comprising a Thermoplastic and a White Pigment as Filler:

Production of the batches for production of a white layer was carried out with a conventional twin-screw compounding extruder (ZSK 32) at processing temperatures customary for polycarbonate of 250° C. to 330° C.

Batches were compounded with the compositions according to table 1 and subsequently pelletized:

TABLE 1

Composition of compounds for production of layers comprising thermoplastics

| | Polycarbonate | Kronos ™ 2230 |
|---|---|---|
| Compound 1 | 85% by weight PC 1 | 10% by weight |
| Compound 2 | 85% by weight PC 2 | 10% by weight |
| Compound 3 | 85% by weight PC 3 | 10% by weight |
| Compound 4 | 85% by weight Makrolon ™ 3108 | 10% by weight |

General Production Procedure for Extrusion Films

The employed apparatus consists of an extruder having a screw of 105 mm in diameter (D) and a length of 41xD. The screw has a devolatilization zone;

a crosshead;

a slot die of 1500 mm in width;

a three-roll smoothing calendar with horizontal roller orientation, wherein the third roller can swivel by +/−45° relative to the horizontal;

a roller conveyor;
an apparatus for double-sided application of protective film;
a haul-off apparatus;
a winding station.

The pellet material was supplied to the extruder hopper. The respective material was melted and conveyed in the respective barrel/screw plasticizing system. The material melt was supplied to the nozzle. The melt passed from the nozzle onto the smoothing calender. On the smoothing calendar the material is subjected to final shaping and cooling. Structuring of the film surfaces was achieved using a matted steel roller (no. 4 surface) and a matted rubber roller (no. 4 surface). The film was subsequently transported through a haul-off and then the film was wound up. The corresponding white opaque extrusion films were produced in this way according to table 2.

TABLE 2

White opaque extrusion films

|  | Compound | Film layer thickness |
|---|---|---|
| Film 1a | 100% compound 1 | 30 μm |
| Film 1b | 100% compound 1 | 100 μm |
| Film 2 | 100% compound 2 | 30 μm |
| Film 3 | 100% compound 3 | 30 μm |
| Film 4a* | 100% compound 4 | 30 μm |
| Film 4b* | 100% compound 4 | 100 μm |
| Film 4c* | 100% compound 4 | 150 μm |

*not according to the invention in each case from the films in the order shown in Table 3 and lamination was carried out with the following parameters on a Bürkle lamination press.

Conditions
  Preheating the press to 170-180° C.
  Pressing for 8 minutes at a pressure of 15 N/cm$^2$
  Pressing for 2 minutes at a pressure of 200 N/cm$^2$
  Cooling the press to 38° C. and opening the press.

TABLE 3

Layer construction of the ID cards having a window

|  | Layer (1) | Layer (2) | Layer (3) | Layer (2) | Layer (1) |
|---|---|---|---|---|---|
| Example 1 | Film 5 (100 μm) | Film 1a (30 μm) | Film 6 (540 μm) | Film 1a (30 μm) | Film 5 (100 μm) |
| Example 2 | Film 5 (100 μm) | Film 2 (30 μm) | Film 6 (540 μm) | Film 2 (30 μm) | Film 5 (100 μm) |
| Example 3 | Film 5 (100 μm) | Film 3 (30 μm) | Film 6 (540 μm) | Film 3 (30 μm) | Film 5 (100 μm) |
| Example 4* | Film 5 (100 μm) | Film 4a (30 μm) | Film 6 (540 μm) | Film 4a (30 μm) | Film 5 (100 μm) |

*not according to the invention

Window Diameter of the ID Cards Before and After Lamination

The diameters of the openings in films 1 to 4a were determined before and after lamination. Before lamination the opening was measured in films 1 to 4a and after lamination the opening was measured in the laminate.

TABLE 4

Diameters of transparent windows before and after lamination

|  | Opening ø 10 mm before lamination | Opening ø 10 mm after lamination | Opening ø 20 mm before lamination | Opening ø 20 mm after lamination |
|---|---|---|---|---|
| Example 1 | 10.1 mm | 9.90 mm | 20.2 mm | 19.65 mm |
| Example 2 | 10.07 mm | 9.88 mm | 20.2 mm | 19.7 mm |
| Example 3 | 10.1 mm | 9.80 mm | 20.2 mm | 19.7 mm |
| Example 4 * | 10.1 mm | 9.70 mm | 20.2 mm | 19.40 mm |

* not according to the invention

Production of Identification Documents (ID Card) Having Transparent Window:

Film 5 (Transparent Overlay Film of Card Construction):

A transparent polycarbonate film of 100 μm in thickness was produced as described hereinabove from 100% Makrolon™ 3108 polycarbonate by extrusion at a melt temperature of about 280° C. Structuring of the film surfaces was achieved using a matted steel roller (no. 6 surface) and a matted rubber roller (no. 2 surface).

Film 6 (Core of Card Construction):

A film as per film 5 was produced but with a thickness of 540 μm.

Provision of the Window:

Stamped into each of the white opaque films 1 to 4a was a hole of 10 mm in diameter and, next to it, a second hole of 20 mm in diameter.

Provision of the Layer Construction of ID Cards

Layer constructions according to table 3 were produced. A symmetrical layer construction of the card was selected to avoid bending of the card. To this end, one stack was formed All cards according to the invention comprising the white films according to the invention 1-3 (examples 1 to 3) showed a smaller change in diameter and thus better contour stability of the stamped pattern compared to example 4. This is particularly advantageous when more complex geometries are used for transparent windows.

Production of Identification Documents (ID Card) With Installed Antenna:

Film 7:

A transparent polycarbonate film of 100 μm in thickness was produced as described hereinabove from 99.9994% Makrolon™ 3108 polycarbonate and 0.0006% (6 ppm) Vulcan XC 72 from Cabot by extrusion at a melt temperature of about 280° C. Structuring of the film surfaces was achieved using a matted steel roller (no. 6 surface) and a matted rubber roller (no. 2 surface).

Layer constructions according to table 5 were produced. To this end, one stack was formed in each case from the films in the order shown in Table 5 and lamination was carried out with the following parameters on a Bürkle lamination press.

For the 250 μm-thick layer 4 a film 4b and a film 4c were superposed. A wire antenna was placed on film 4b in such a way that this wire antenna was in contact with layer 3.

Lamination Conditions

Preheating the press to 170-180° C.
Pressing for 8 minutes at a pressure of 15 N/cm²
Pressing for 2 minutes at a pressure of 200 N/cm²
Cooling the press to 38° C. and opening the press.

TABLE 5

| ID documents with installed antenna between layers 3 and 4 | | | | | | |
|---|---|---|---|---|---|---|
| | Layer (1) | Layer (2) | Layer (3) | Layer (4) | Layer (5) | Layer (6) |
| Example 5 | Film 5 100 μm | Film 7 100 μm | Film 1b 100 μm | Film 4b + 4c 250 μm | Film 7 100 μm | Film 5 100 μm |
| Example 6* | Film 5 100 μm | Film 7 100 μm | Film 4b 100 μm | Film 4b + 4c 250 μm | Film 7 100 μm | Film 5 100 μm |

*not according to the invention

The card in which the film according to the invention 1b adjoined the layer comprising film 4b upon which the wire antenna was placed exhibited a straight surface between the film according to the invention 1b and the wires after visual inspection (example 5). In example 6* (not according to the invention) in which the film 4b (layer 3) adjoins the layer of film 4b the antenna wires push through, i.e. there was distortion of the layers above and thus visibility of the wire antennas in the card.

The invention claimed is:

1. A layer construction comprising
a) at least one opaque layer a) containing one or more polycarbonates based on diphenols or copolycarbonates based on diphenols, wherein the at least one layer a) has a light transmission of ≥0.1% and ≤85%, determined according to ISO 13468-2:2006-07 and
b) at least one further transparent layer b) containing at least one thermoplastic, wherein the at least one further layer b) has a light transmission of ≥85% and ≤98%, determined according to ISO 13468-2:2006-07,
wherein the one or more polycarbonates or copolycarbonates of layer a) have a Vicat softening temperature B/120 determined according to ISO 306:2004 (method B120 50N; 120° C./h) of ≥156° C.,
wherein the Vicat softening temperature of the one or more polycarbonates or copolycarbonates of layer a) is higher than a Vicat softening temperature of the thermoplastic of layer b), and
wherein the one or more polycarbonates based on diphenols or copolycarbonates based on diphenols in the at least one layer a) comprise at least one carbonate structural unit of formula (I-1), (I-2), (I-3) or (I-4)

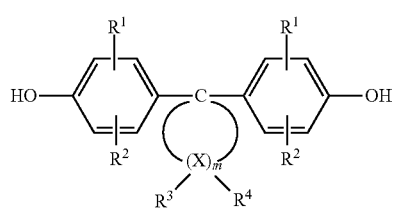

(I-1)

wherein
$R^1$ and $R^2$ independently of one another represent hydrogen, halogen, $C_1$-$C_8$-alkyl, $C_5$-$C_6$-cycloalkyl, $C_6$-$C_{10}$-aryl, or $C_7$-$C_{12}$-aralkyl,
m is an integer from 4 to 7,
$R^3$ and $R^4$ individually selectable for each X independently of one another represent hydrogen or $C_1$-$C_6$-alkyl, and
X represents carbon, with the proviso that for at least one atom X, $R^3$ and $R^4$ both represent alkyl,

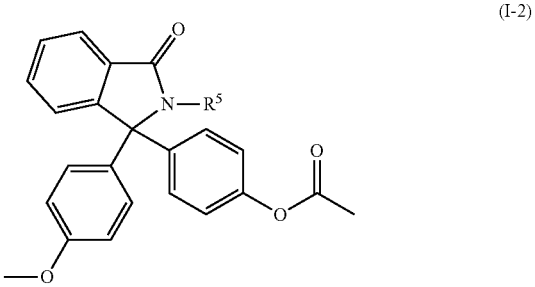

(I-2)

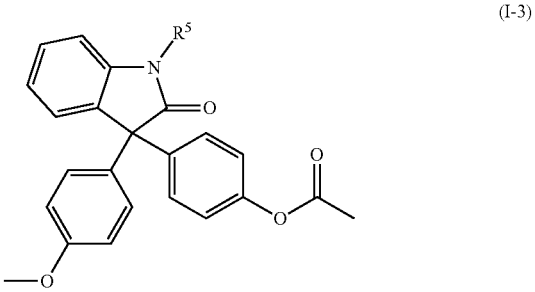

(I-3)

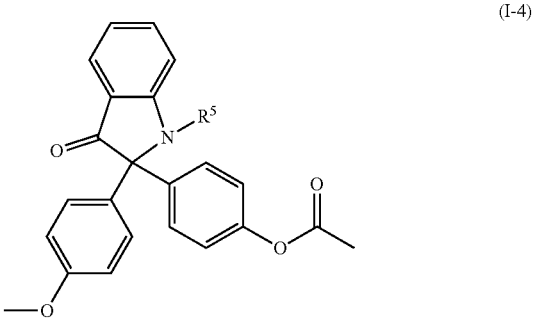

(I-4)

wherein $R^5$ represents a $C_1$-to $C_4$-alkyl radical, aralkyl radical or aryl radical.

2. The layer construction as claimed in claim 1, wherein the at least one layer b) comprises a thermoplastic having a Vicat softening temperature of B/120 determined according to ISO 306 (50N; 50°/h) in a range from ≥135° C. to ≤155° C.

3. The layer construction as claimed in claim 1, wherein in the at least one layer a) the one or more polycarbonates based on diphenols or copolycarbonates based on diphenols comprises at least one carbonate structural unit of formula (I-1).

4. The layer construction as claimed in claim 1, wherein the at least one layer a) comprises at least one opening.

5. The layer construction as claimed in claim 1, wherein the at least one layer a) comprises a filler.

6. The layer construction as claimed in claim 1, wherein the at least one layer a) has a thickness of ≥10 to ≤300 μm.

7. The layer construction as claimed in claim 1, wherein the at least one layer b) comprises at least one thermoplastic selected from polymers of ethylenically unsaturated monomers and/or polycondensates of bifunctional reactive compounds.

8. The layer construction as claimed in claim 1, further comprising at least one further layer c) comprising at least one thermoplastic, the at least one further layer c) having a light transmission of ≥85% to ≤98%, determined according to ISO 13468-2:2006-07.

9. The layer construction as claimed in claim 1, further comprising at least one further layer c) containing one or more polycarbonates based on diphenols or copolycarbonates based on diphenols.

10. The layer construction as claimed in claim 1, further comprising at least one laser-sensitive additive present in one or more of the at least one layer a), the at least one layer b), or at least one further layer c).

11. The layer construction as claimed in claim 1, wherein at least one electronic component, at least one volume hologram, at least one embossed hologram, or a combination thereof is arranged between the at least one layer a) and the at least one layer b).

12. The layer construction as claimed in claim 7, wherein the at least one thermoplastic comprises one or more polycarbonates based on diphenols or copolycarbonates based on diphenols, poly- or copolyacrylates and poly- or copolymethacrylates, poly- or copolymers of styrene, polyurethane(s) and polyolefin(s), poly- or copolycondensates of terephthalic acid, poly- or copolycondensates of naphthalenedicarboxylic acid, poly- or copolycondensates of at least one cycloalkyldicarboxylic acid, polysulfones, or mixtures thereof.

13. A layer construction comprising
a) at least one opaque layer a) containing one or more polycarbonates based on diphenols or copolycarbonates based on diphenols, wherein the at least one layer a) has a light transmission of ≥0.1% and ≤85%, determined according to ISO 13468-2:2006-07 and
b) at least one further transparent layer b) containing at least one thermoplastic, wherein the at least one further layer b) has a light transmission of ≥85% and ≤98%, determined according to ISO 13468-2:2006-07,
wherein the one or more polycarbonates or copolycarbonates of layer a) have a Vicat softening temperature B/120 determined according to ISO 306:2004 (method B120 50N; 120° C./h) of ≥156°° C.,
wherein the Vicat softening temperature of the one or more polycarbonates or copolycarbonates of layer a) is higher than a Vicat softening temperature of the thermoplastic of layer b),
wherein the one or more polycarbonates based on diphenols or copolycarbonates based on diphenols in the at least one layer a) comprise at least one carbonate structural unit of formula (I-1), (I-2), (I-3) or (I-4)

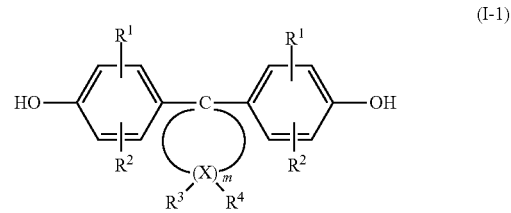

wherein
$R^1$ and $R^2$ independently of one another represent hydrogen, halogen, $C_1$-$C_8$-alkyl, $C_5$-$C_6$-cycloalkyl, $C_6$-$C_{10}$-aryl, or $C_7$-$C_{12}$-aralkyl,
m is an integer from 4 to 7,
$R^3$ and $R^4$ individually selectable for each X independently of one another represent hydrogen or $C_1$-$C_6$-alkyl, and
X represents carbon, with the proviso that for at least one atom X, $R^3$ and $R^4$ both represent alkyl,

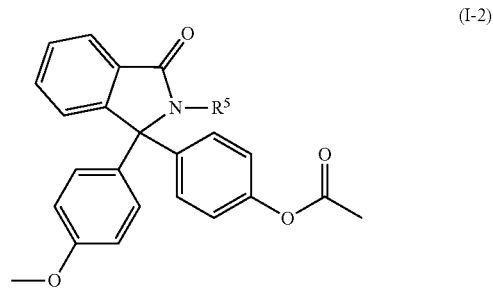

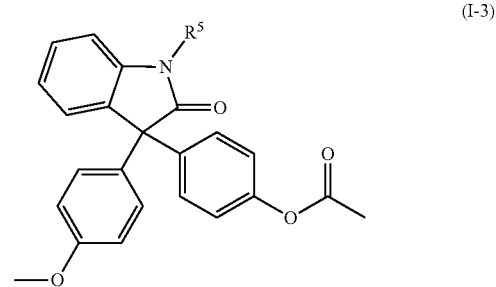

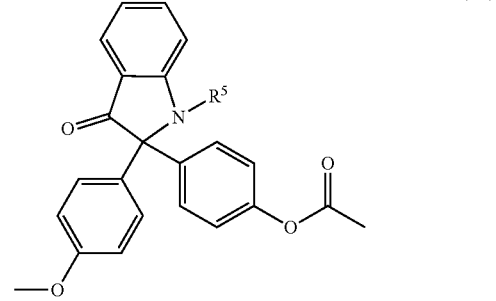

wherein $R^5$ represents a $C_1$- to $C_4$-alkyl radical, aralkyl radical or aryl radical,
wherein layer a) has at least one opening,
wherein layer a) has a layer thickness of ≥10 to ≤150 μm, and
wherein layer a) is not filled with a thermoplastic material.

14. A security document, comprising at least one layer construction as claimed in claim 1.

15. A process for producing a layer composite comprising
providing a layer construction as claimed in claim 1,
optionally placing one or more electronic components, one or more volume holograms, one or more embossed holograms, or a combination thereof between the at least one layer a) and the at least one layer b),
optionally stamping at least one opening in layer a),
optionally providing at least one further layer c) comprising at least one thermoplastic,
laminating the layer construction at a temperature of 120° C. to 210° C. and a pressure of 10 N/cm$^2$ to 400 N/cm$^2$.

* * * * *